(12) United States Patent
Paajarvi et al.

(10) Patent No.: US 10,379,000 B2
(45) Date of Patent: Aug. 13, 2019

(54) METHOD FOR ROLLING BEARING FAULT DETECTION BASED ON ENHANCING STATISTICAL ASYMMETRY

(75) Inventors: Patrik Paajarvi, Lulea (SE); James P Leblanc, Lulea (SE)

(73) Assignee: RUBICO AB, Luleå (SE)

( * ) Notice: Subject to any disclaimer, the term of this patent is extended or adjusted under 35 U.S.C. 154(b) by 62 days.

(21) Appl. No.: 13/638,602

(22) PCT Filed: Mar. 30, 2011

(86) PCT No.: PCT/SE2011/000060
§ 371 (c)(1),
(2), (4) Date: Sep. 30, 2012

(87) PCT Pub. No.: WO2011/123014
PCT Pub. Date: Oct. 6, 2011

(65) Prior Publication Data
US 2013/0024164 A1    Jan. 24, 2013

(30) Foreign Application Priority Data
Mar. 30, 2010   (SE) ...................................... 1000313

(51) Int. Cl.
*G01M 13/045*   (2019.01)
(52) U.S. Cl.
CPC ................................ *G01M 13/045* (2013.01)
(58) Field of Classification Search
CPC ........... G01H 1/003; G01N 2291/2696; G01N 29/12; G01M 5/0066; G01M 7/00; G01M 13/028; G01M 13/045
USPC .................. 702/183, 181, 179, 185, 190, 56
See application file for complete search history.

(56) References Cited

U.S. PATENT DOCUMENTS

| 7,505,852 B2 | 3/2009 | Board |
| 2004/0199368 A1 | 10/2004 | Bechhoefer |
| 2007/0282545 A1* | 12/2007 | Board ............................ 702/56 |

OTHER PUBLICATIONS

Lee et al, Blind Deconvolution of Impacting Signals Using Higher-Order Statistics, 1998, Mechanical Systems and Signal Processing, 12(2), 357-371.*

* cited by examiner

*Primary Examiner* — Stephanie E Bloss
*Assistant Examiner* — Lisa E Peters
(74) *Attorney, Agent, or Firm* — Ladas & Parry LLP; Malcolm J. MacDonald

(57) ABSTRACT

A method for digital processing of vibration signals from rolling bearings in rotating machines is presented, allowing subsequent fault detection with high reliability. A linear, adaptive filter is applied to the acquired vibration signal and iteratively tuned to increase the statistical asymmetry of its output. In this process, the filter removes phase- and amplitude distortion from underlying fault impulses. Furthermore, suppression of sinusoidal disturbances is simultaneously achieved with high robustness to measurement noise. The result is a processed signal from which rolling bearing defects are more easily detected.

5 Claims, 3 Drawing Sheets

METHOD FOR ROLLING BEARING FAULT DETECTION BASED ON ENHANCING STATISTICAL ASYMMETRY

BACKGROUND OF THE INVENTION

Rolling bearings enable low-friction movement under heavy loads in rotating machinery with applications ranging from industrial processes to wind turbines and vehicles. It is an accepted fact that even if all necessary operating conditions such as sufficient lubrication, proper alignment and a good surrounding environment are met, fatigue and mechanical wear of the contact surfaces bearings is unavoidable. Proper functionality of bearings is often critical and a breakdown can cause large economical loss or even pose a threat to personal safety. In heavy industrial processes such as steelmaking, the degradation can be quite rapid due to inherently harsh environments combined with severe loads.

To avoid unpredicted failures and enable planned maintenance, scheduled or continuous condition monitoring of a bearings state is standard practice where feasible. Vibration analysis is a common condition-monitoring technique in which the vibrations from a spinning bearing are measured with, a transducer and analysed on some digital processing platform, looking for signs of incipient or imminent damage. Contact surface defects create impulsive vibrations, occurring periodically as rolling elements strike developing pits or cracks in the bearing races. If sufficiently strong, these periodic impacts show up as peaks in the vibration signal's frequency spectrum which may then be matched to the bearing's characteristic frequencies, corresponding to each of the different expected faults (e.g. inner/outer race damage). The characteristic frequencies are calculated in advance from the bearing's dimensions and the axis rotation speed, see N. Tandon and A. Choudhury, "A review of vibration and acoustic measurement methods for the detection of defects in rolling element bearings," Tribology international, vol. 32, pp, 469-480, August 1999. Vibration analysis can be done either by using a portable, hand-held instrument (scheduled monitoring) or with a permanently mounted system performing continuous trend monitoring.

The main challenge in performing successful vibration analysis is to detect and enhance the weak, impulsive vibrations associated with bearing defects in measured signals plagued by measurement noise and disturbing vibrations. Furthermore, the unknown and non-trivial transfer function between the fault-impulse sources (i.e. rolling elements striking surface defects) and the transducer results in phase and amplitude distortion that tends to obscure the vibration patterns of interest by reducing the signal's 'peakiness', see S. C Braun, "The signature analysis of sonic bearing vibrations," IEEE Transactions on Sonics and Ultrasonics, vol. SU-27, pp, 317-328, November 1980. A signal pre-processing method is generally required to improve the signal quality beige the actual hearing condition assessment is made. Examples of such processing can be found in U.S. Pat. No. 6,868,348 B1 and U.S. Pat. No. 6,648,700 B1.

The shock pulse method (SPM) is a simple, widespread technique utilizing a vibration transducer with a tuned resonance frequency to detect the presence of fault-induced impulses in a bandpass frequency range around 32 kHz. This center frequency is selected to, in most cases, produce a high signal-to-noise ratio by making the transducer sensitive to fault impulses while filtering out lower frequencies, where most disturbing vibrations reside. A related, more advanced approach is the popular high-frequency resonance technique (HFRT), also called envelope analysis, in which a bandpass-filtered vibration signal is subject to envelope detection to reveal impulsive vibrations. Despite its popularity, HFRT is known to have issues with reliability, especially if the bearing damage is well progressed, (see N. Tandon and A. Choudhury, "A review of vibration and acoustic measurement methods for the detection of defects in rolling element bearings," Tribology international, vol. 32, pp. 469-480, August 1999) and requires careful selection of the bandpass filter's center frequency depending on the measurement setting, see P. D. McFadden and J. D. Smith, "Vibration monitoring of rolling element bearings by the high-frequency resonance technique—a review," Tribology international, vol. 17, pp. 3-40, February 1984. Also, the non-linear operations involved in envelope detection requires a high signal-to-noise ratio (SNR) for reliable results.

A different approach that avoids the use of specialized transducers or non-linear signal processing is to employ the principle of deconvolution. A linear, digital filter is used to compensate for the distorting transfer function between the fault-vibration source and the transducer so that any underlying impulses appear less distorted. Simple deconvolution examples for other applications can be found in U.S. Pat. Nos. 5,744,722 and 5,130,951. In the deconvolution technique, the measured vibration signal is modeled as a stochastic process and the transfer function as an unknown, linear system. The parameters of an adaptive deconvolution filter are then adjusted in an iterative algorithm to optimise the resulting output signal quality according to some statistical measure. Traditionally, kurtosis is employed as the statistical measure to maximize for deconvolution of hearing vibration signals, sec N. Sawalhi, R. B. Randall, and H. Endo, "The enhancement of fault detection and diagnosis in rolling element bearings using minimum entropy deconvolution combined with spectral kurtosis," Mechanical systems and signal processing, vol. 21, pp. 2616-2633. August 2007, Kurtosis is defined as the normalized fourth moment of a random variable and reflects a signal's peakiness. The rationale is that the filter setting that maximizes the kurtosis of the output (i.e. maximizes its peskiness) also gives optimum transfer function distortion removal under the given conditions to enhance an underlying impulsive vibrations as much as possible.

While simple and intuitively attractive, deconvolution by maximizing kurtosis proves less useful in practice as the adaptive deconvolution filter is likely to amplify disturbing sinusoidal vibrations, which will therefore mask any weak impulsive vibrations and cause bearing defects to go undetected. The reason for this is that the sinusoidal disturbances typically found in vibrations from rotating machines are not clearly distinguished from impulses in terms of their kurtosis value. While sinusoids may be suppressed with an adaptive, noise-cancelling filter prior to deconvolution, this increases not only the implementation cost but also the risk of accidentally cancelling defect signatures, see D. Ho and R. B. Randall, "Optimisation of bearing diagnostic techniques using simulated and actual bearing fault signals," Mechanical signals and signal processing, vol. 14, pp. 763-788, September 2000.

More sophisticated processing techniques, such as wavelet-based methods and neural network algorithms have also been considered. While these may give decent reliability, they are far more computationally demanding and are thus only when power and processing capacity is abundant. This excludes compact, low-cost or energy-efficient solutions such as handheld devices and embedded processing systems.

OBJECTIVE OF THE INVENTION

Against the provided background, there exists a need for a reliable signal preprocessing method capable of giving fault-impulse enhancement combined with suppression of sinusoidal disturbances and robustness against noise for condition monitoring of rolling bearings. Furthermore, the growing industrial demand for compact, low-power monitoring systems places emphasis on computational simplicity without sacrificing performance.

SUMMARY OF THE INVENTION

The present invention improves traditional deconvolution of bearing vibration signals by noting that fault impulses (signals of interest) are different from noise and disturbances (undesired signals) in terms of statistical asymmetry, an indicator of which is first defined here for a random variable.
Definition 1 (Statistical Asymmetry of a Random Variable)

Let X be a random variable with mean value $\mu_x$ and probability density function (pdf) $f_X(x)$. We define an indicator $\phi$ of the statistical asymmetry of X to be $$\phi(X) \triangleq \frac{\int_{-\infty}^{\infty} g(x) f_X(x) \, dx}{h(X)} \quad (1)$$

where g(x) is an arbitrary non-linear and odd function of x, and h(X) is chosen, dependent on g(x), to enforce scale-invariance so that $\phi(\alpha X)=\phi(X)$ for any $\alpha>0$.

$\Phi(X)=0$ indicates that X is statistically symmetric. By modeling a vibration signal as a discrete-time (sampled), stationary, stochastic process, statistical asymmetry of such a signal can now be defined.
Definition 2 (Statistical Asymmetry of a Stochastic Process)

Let v(n) be a discrete-time, stationary, stochastic process over time index n for which each sample is a unit-variance random variable X with pdf $f_X(x)$. Then, the statistical asymmetry of the process v(n) is $\Phi(X)$.

Under Definitions 1 and 2 above, fault vibrations from rolling bearings are recognized as being statistically asymmetric ($\Phi \neq 0$) while linearly distorted variants, as well as disturbances such as sinusoids and measurement noise, are essentially symmetric ($\Phi=0$), which therefore makes them distinguishable from the vibration patterns of interest. The linear deconvolution filter should be used to increase the statistical asymmetry of the measured vibration signal for the following reasons:

1. Increasing the statistical asymmetry reduces transfer function distortion. The phase- and amplitude distortion caused by the transfer function between the fault-vibration source and the transducer tends to obscure the underlying impulses by making them appear as damped oscillations or, in other words, as more statistically symmetric vibrations. As the deconvolution filter should 'undo' this distortion, it should hence be tuned to increase the asymmetry of its output.
2. An algorithm increasing the statistical asymmetry is robust against noise and disturbances. Unlike kurtosis, statistical asymmetry distinguishes between the signal of interest and disturbances. Therefore, increasing asymmetry will not accidentally enhance disturbances.
3. Increasing statistical asymmetry can be achieved using low-cost algorithms. Simple embodiments are possible that require relatively small amounts of computations and hence have low power requirements.

Statistical asymmetry as an indicator of bearing defects has been proposed in U.S. Pat. Nos. 5,852,793 and 7,505,852 B2. Deconvolution methods related to enhancing statistical asymmetry have also been evaluated for other applications, see for example J.-Y. Lee and A. K. Nandi, "Blind deconvolution of impacting signals using higher-order statistics," *Mechanical systems and signal processing*, vol. 12, pp. 357-371, March 1998. However, the approach of increasing statistical asymmetry with an adaptive, linear filter for condition monitoring of rolling bearings has not previously been explored.

DESCRIPTION OF THE PREFERRED EMBODIMENT

An embodiment of the invention is now described in which it is assumed that a vibration signal from a rotating machine with one or several bearings is converted to electrical form using a transducer, such as an piezoelectric accelerometer, and given as input to a vibration analysis process. Other possible means of supplying such an input include reading a previously measured signal from a storage media.

Figure 1:
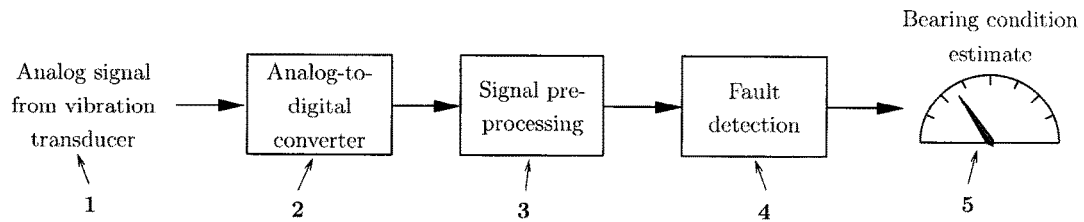
FIG. 1 is a block diagram showing the principle of condition monitoring using vibration analysis.

An overview of the steps involved in general vibration analysis is found in FIG. 1, illustrating the use of signal pre-processing followed by bearing condition assessment. The input vibration signal 1 from the transducer is first converted from analog to digital form. The sampling rate used in the analog-to-digital (A-to-D) conversion 2 must be greater than twice the highest vibration frequency of interest for the current application. The digital signal is then input to a signal preprocessing step 3 to suppress transfer-function distortion and disturbances that act to obscure any underlying impulsive vibrations significant for fault detection. This type of processing can for example be performed on specialized hardware such a a digital signal processor (DSP), a general-purpose microcontroller or any generic computer platform. Once processed, the resulting signal is input to a fault detection algorithm 4, producing an estimate 5 of the bearing condition. The bearing condition may be presented in the form of a value on a continuous scale (e.g. expected remaining life time) or as one of a finite set of indicators (e.g. OK/replace).

Figure 2:
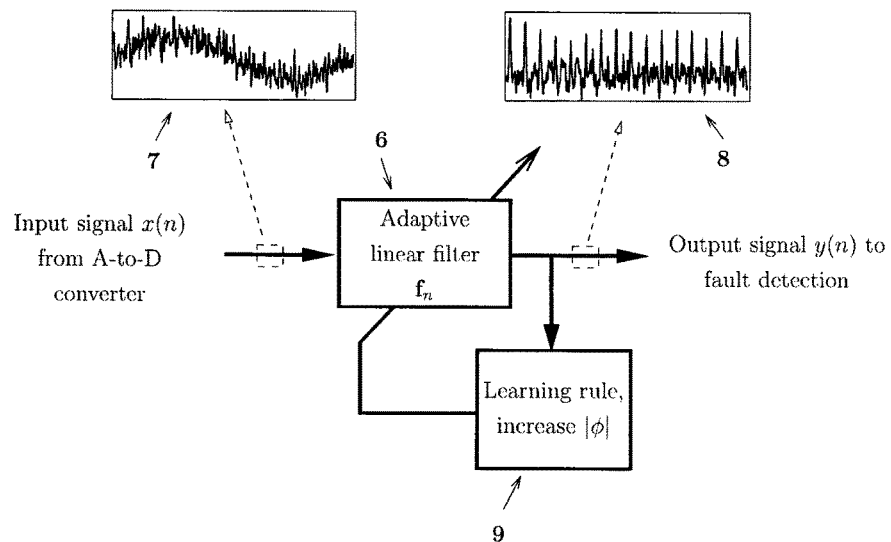
FIG. 2 is a block diagram of the process of enhancing statistical asymmetry with a linear, adaptive filter.
Figure 3:
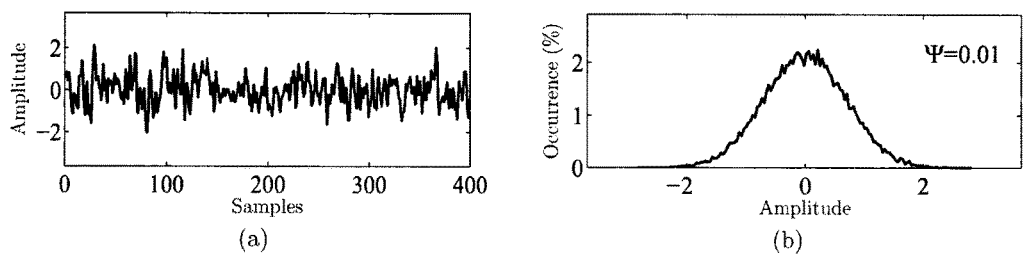
FIG. 3 illustrates the vibration signal (a) and corresponding histogram (b) from a functional rolling bearing.
Figure 4:
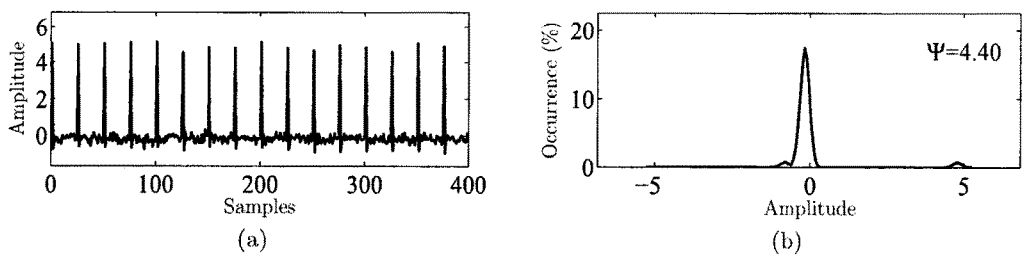
FIG. 4 illustrates the impulsive vibration source signal (a) and corresponding histogram (b) from a defective rolling bearing.
Figure 5:
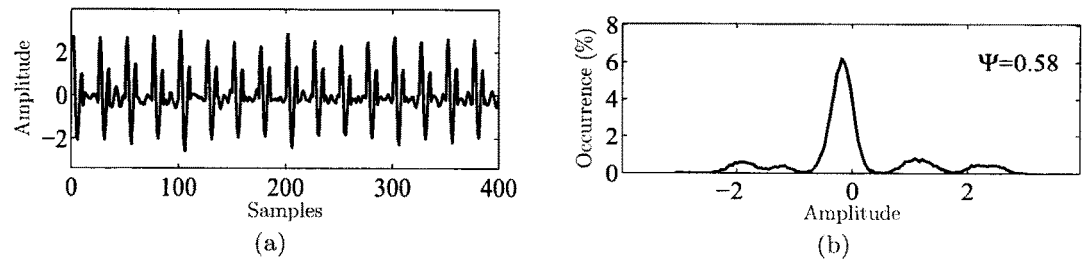
FIG. 5 illustrates a measured noise- and disturbance-free vibration signal (a) and corresponding histogram (b) from a defective rolling bearing.

The present invention concerns the signal pre-processing step 3, the principle of which is shown in FIG. 2. A digital, adaptive, linear filter 6 takes as input the signal x(n)7 from the A-to-D converter 2. The filter parameters are iteratively adjusted towards increasing the magnitude of the statistical asymmetry Φ of the output signal y(n)8 using a learning rule 9.

As one example of an embodiment of the invention, the adaptive filter is assumed to be of finite impulse response (FIR) type, represented at time n by the N×1 parameter vector $$f_n \triangleq [f_0^{(n)} f_1^{(n)} \ldots f_{N-1}^{(n)}]^T, \quad (2)$$

where $f_i^{(n)}$ is the $i^{th}$ parameter at time n. The filter output signal sample y(n) at time n is obtained as $$y(n) = f_n^T x_n = \sum_{i=0}^{N-1} f_i x(n-i), \quad (3)$$

where T denotes vector transpose and $x_n$ is an N×1 vector storing the N latest samples of the input signal x(n), $$x(n) \triangleq [x(n) x(n-1) \ldots x(n-N+1)]^T. \quad (4)$$

With each new input sample, the corresponding output sample y(n) is calculated as (3) and the filter parameter vector $f_n$ is updated in an iterative manner to increase the magnitude of the output signal's statistical asymmetry. A possible realization of this is to form a parameter-vector update term aimed at increasing the skewness of the output signal y(n) through a small parameter adjustment. The skewness Ψ of a zero-mean random variable X is defined as its normalized third moment, $$\Psi(X) \triangleq \frac{E\{X^3\}}{(E\{X^2\})^{3/2}}. \quad (5)$$

For a signal v(n) modelled as a discrete-time, stationary, stochastic process where each sample is a random variable X, the skewness of v(n) is simply defined as the skewness of X, i.e. Ψ(v(n))=Ψ(X).

The filter update term is formed from an estimate of the N×1 gradient vector $\nabla_\Psi(n)$ of the output signal skewness with respect to the current parameter vector, $$\nabla_\Psi(n) \triangleq \frac{\partial \Psi(y(n))}{\partial f_n} = \left[\frac{\partial \Psi(y(n))}{\partial f_0^{(n)}} \frac{\partial \Psi(y(n))}{\partial f_1^{(n)}} \ldots \frac{\partial \Psi(y(n))}{\partial f_{N-1}^{(n)}}\right]^T. \quad (6)$$

Hence, the vector $\nabla_\Psi(n)$ gives the direction of adjustment for $f_n$ giving the most rapid increase of the output signal skewness. An estimate $\hat{\nabla}^\Psi(n)$ of (6) is calculated from a finite set of signal samples and used to form the iterative filter parameter update at time n as $$f_{n+1} = f_n + \mu \hat{\nabla}_\Psi(n), \quad (7)$$

where μ is a small, constant stepsize parameter. The iterative update process (7) proceeds either indefinitely or until some criterion is attained, such as a certain level of skewness in y(n).

The rationale behind the use of statistical asymmetry in the present invention is illustrated in FIGS. 3-8, showing the characteristics of different bearing-related signals. FIGS. 3a and 4a show simulated vibration patterns from a functional and defective hearing respectively. The corresponding histograms, or estimated pdf's, are displayed in FIGS. 3b and 4b respectively, which also show the estimated skewness (Ψ) of the signals. Note how the impulses present in the signal from the defective bearing (FIG. 4a) increases the asymmetry in the pdf resulting in a higher skewness, while the skewness of the functional bearing vibration signal (FIG. 3a) is close to zero. In FIG. 5a, the defective-bearing impulses from FIG. 4a have been convolved with an exponentially decaying sinusoid, a typical model of a transfer function between the impulsive source and the transducer. Hence, FIG. 5a represents an ideal (noise- and disturbance free) vibration signal from a faulty bearing. Note from FIG. 5b how the phase- and amplitude distortion caused by the transfer function decreases the skewness to result in an almost symmetric signal.

Figure 6:
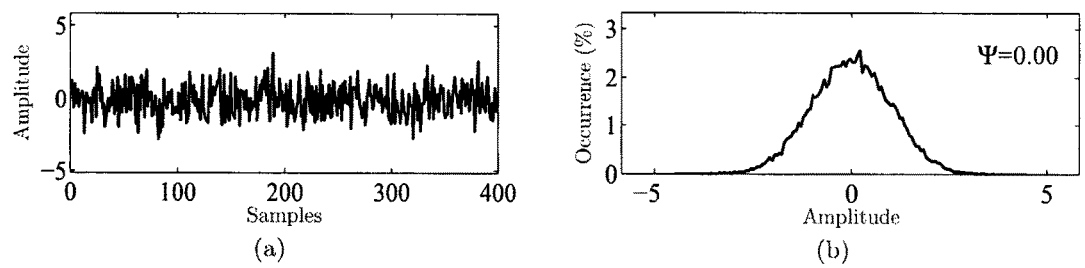
FIG. 6 illustrates generic measurement noise (a) and corresponding histogram (b).
Figure 7:
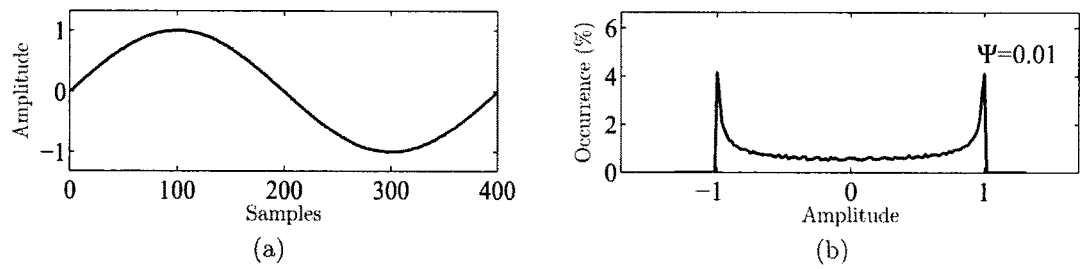
FIG. 7 illustrates a sinusoidal disturbance (a) and corresponding histogram (b).
Figure 8:
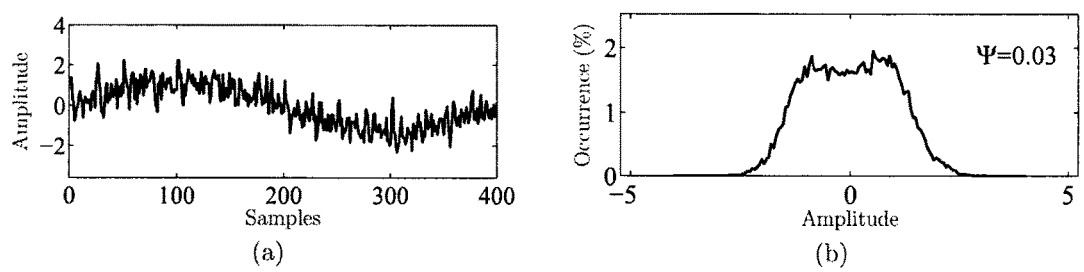
FIG. 8 illustrates a typical measured vibration signal (a) and corresponding histogram (b) from a defective rolling bearing.

The characteristics of two common kinds of disturbances are found in FIGS. 6 and 7. FIG. 6 shows white Gaussian measurement noise which is symmetric. FIG. 7 illustrates a common disturbing vibration in the form of a sinusoid, also being essentially symmetric.

The signal in FIG. 8a is the sum of those from FIGS. 5a, 6a and 7a with different individual scaling, modelling a typical measured vibration signal from a faulty bearing consisting of weak, distorted impulsive vibrations plus noise and a strong sinusoidal disturbance. As seen from the resulting histogram in FIG. 8b, this vibration pattern is practically symmetric, reflected by its low skewness. Note how the originally clear impulsive fault signatures from FIG. 4a are now hard to distinguish in FIG. 8a.

Figure 9:
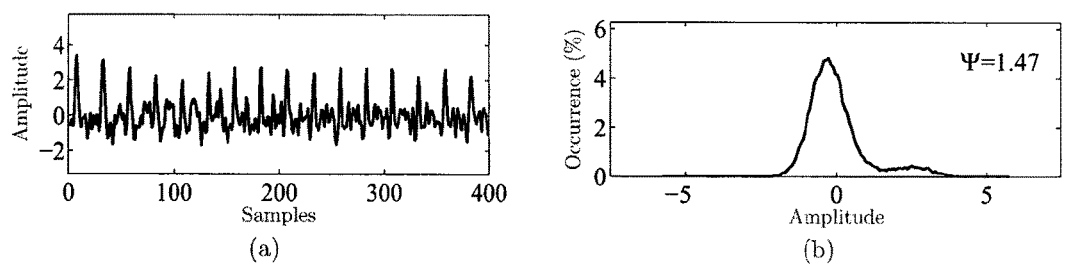
FIG. 9 illustrates the output signal (a) and corresponding histogram (b) from a linear adaptive filter aimed to increase the statistical asymmetry of a measured vibration signal from a defective rolling bearing.

To demonstrate the functionality of the invention, the signal from FIG. 8a was applied to an adaptive filter as in FIG. 2, subject to skewness enhancement according to (7) using an FIR filter with 64 filter parameters. The resulting output signal after 500 iterations is shown in FIG. 9a. The impulsive vibration pattern becomes clearly visible and the increased asymmetry is apparent from FIG. 9b. The restored impulsive pattern confirms that increasing asymmetry with an adaptive filter can successfully perform suppression of both transfer function distortion and sinusoidal disturbances in the presence of measurement noise.

Alternative embodiments of the invention may be obtained by letting the filter parameter vector $f_n$ be iteratively adjusted to increase, instead of skewness, the magnitude of any odd, normalized moment of order ≥3 of the filter output signal. The $m^{th}$-order odd moment $\Psi_m$ of a zero-mean random variable X is defined as $$\Psi_m(X) \triangleq \frac{E\{X^m\}}{(E\{X^2\})^{m/2}}, \quad (8)$$

where m is any positive, odd integer greater ≥3. Note that the choice m=3 gives skewness as defined by (5). The filter update term is thus formed from an estimate of the gradient vector $$\nabla_{|\Psi_m|}(n) \triangleq \frac{\partial |\Psi_m(y(n))|}{\partial f_n}, \quad (9)$$

and the filter parameter update becomes $$f_{n+1} = f_n + \mu \hat{\nabla}_{|\Psi_m|}(n), \quad (10)$$

where μ it is a small, constant stepsize parameter and $\hat{\nabla}_{|\Psi_m|}(n)$ is an estimate of $\nabla_{|\Psi_m|}(n)$.

While the present invention has been described by preferred embodiments above, it is not the intention of the applicants to restrict or limit the scope of the claims accordingly. It is recognized that numerous other variants of embodiments are possible to those skilled in the art.

What is claimed is:

1. A method of indicating a fault in a rolling bearing in a rotating machine by improving the quality of a digital vibration signal from the rotating machine through suppression of disturbances and noise, and removal of transfer function distortion, the method comprising the steps of:

providing a computer platform;

processing said digital vibration signal using said computer platform implementing a linear, digital, adaptive filter, whose output signal is modelled as a stationary stochastic process, with each sample, a random variable X having a probability density function fx(x) and mean value px;

adjusting the parameters of said linear, digital, adaptive filter in a control algorithm resulting in an increase of the magnitude of $\phi(X)$, with $\phi(X)$ defined as $$\phi(X) \triangleq \frac{\int_{-\infty}^{\infty} g(x) f_X(x - \mu_X) dx}{h(X)}$$

$\phi$ being an indicator of the statistical asymmetry of X;

g(x) being an arbitrary non-linear and odd function of x and h(X) chosen, dependent on g(x), so that $\phi(\alpha X) = \phi(X)$ for any $\alpha > 0$; and examining a frequency spectrum of the output signal of said linear, digital, adaptive filter;

comparing values of the frequency spectrum at frequency points corresponding to characteristic frequencies of said rolling bearing; and wherein a fault in said rolling bearing in said rotating machine is indicated if said values in said frequency spectrum exceed a set value.

2. The method of claim 1, wherein said linear, digital, adaptive filter is of finite impulse response (FIR) type, or infinite impulse response (IIR) type.

3. The method of claim 1, wherein said digital vibration signal is retrieved from a storage media.

4. The method of claim 1, wherein arbitrary analog or digital pre-processing is applied to the said digital vibration signal prior to the said linear, digital, adaptive filter.

5. The method of claim 1, wherein said digital vibration signal is acquired using a vibration sensor whose output signal has been converted from analog to digital form.

* * * * *